United States Patent
Palmer

(10) Patent No.: US 11,687,469 B2
(45) Date of Patent: *Jun. 27, 2023

(54) HOST-RESIDENT TRANSLATION LAYER VALIDITY CHECK TECHNIQUES

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,466

(22) Filed: Jan. 14, 2022

(65) Prior Publication Data

US 2022/0206959 A1    Jun. 30, 2022

Related U.S. Application Data

(63) Continuation of application No. 16/226,078, filed on Dec. 19, 2018, now Pat. No. 11,226,907.

(51) Int. Cl.
*G06F 21/00* (2013.01)
*G06F 12/14* (2006.01)
*G06F 12/06* (2006.01)
*G06F 21/60* (2013.01)

(52) U.S. Cl.
CPC ...... *G06F 12/1408* (2013.01); *G06F 12/0646* (2013.01); *G06F 21/602* (2013.01); *G06F 2212/1052* (2013.01)

(58) Field of Classification Search
CPC . G06F 12/0646; G06F 12/1408; G06F 21/602
See application file for complete search history.

(56) References Cited

U.S. PATENT DOCUMENTS

| | | | |
|---|---|---|---|
| 5,812,861 | A | 9/1998 | Ishac et al. |
| 6,009,528 | A | 12/1999 | Teraoka |
| 6,345,347 | B1 | 2/2002 | Biran |
| 8,161,353 | B2 | 4/2012 | Flynn et al. |
| 8,539,148 | B1 | 9/2013 | Ku et al. |
| 9,229,853 | B2 | 1/2016 | Khan et al. |
| 9,336,412 | B2 | 5/2016 | Choi et al. |
| 9,407,642 | B2 | 8/2016 | Korkishko et al. |

(Continued)

FOREIGN PATENT DOCUMENTS

| | | |
|---|---|---|
| CN | 103136116 | 6/2013 |
| CN | 104885062 | 9/2015 |

(Continued)

OTHER PUBLICATIONS

"Chinese Application Serial No. 201980062579.5, Response Filed Dec. 16, 2021 to Office Action dated Aug. 2, 2021", W English Claims, 66 pgs.

(Continued)

*Primary Examiner* — Jeffrey C Pwu
*Assistant Examiner* — Thong P Truong
(74) *Attorney, Agent, or Firm* — Schwegman Lundberg & Woessner, P.A.

(57) ABSTRACT

Devices and techniques are disclosed herein for verifying host generated physical addresses at a memory device during a host-resident FTL mode of operation to ameliorate erroneous or potentially malicious access to the memory device.

19 Claims, 4 Drawing Sheets

(56) References Cited

U.S. PATENT DOCUMENTS

| | | |
|---|---|---|
| 9,489,317 B2 | 11/2016 | Sauer |
| 9,519,578 B1 | 12/2016 | Kuzmin et al. |
| 9,645,757 B2 | 5/2017 | Chinnakkonda Vidyapoornachary et al. |
| 9,672,384 B2 | 6/2017 | Goto et al. |
| 9,749,319 B2 | 8/2017 | Serebrin |
| 9,785,369 B1 | 10/2017 | Ateniese et al. |
| 9,804,976 B1 | 10/2017 | Stark et al. |
| 9,823,872 B2 | 11/2017 | Danilak et al. |
| 9,898,404 B2 | 2/2018 | Huang et al. |
| 10,424,388 B2 | 9/2019 | Oh et al. |
| 10,459,845 B1 | 10/2019 | Cariello |
| 10,489,289 B1 | 11/2019 | Peterson et al. |
| 10,510,419 B1 | 12/2019 | Yamada et al. |
| 10,803,957 B2 | 10/2020 | Yamada et al. |
| 10,852,964 B2 | 12/2020 | Grosz |
| 10,923,202 B2 | 2/2021 | Palmer |
| 11,036,625 B1 | 6/2021 | Balluchi et al. |
| 11,226,894 B2 | 1/2022 | Palmer et al. |
| 11,226,907 B2 | 1/2022 | Palmer |
| 11,263,124 B2 | 3/2022 | Palmer |
| 2002/0112178 A1 | 8/2002 | Scherr |
| 2006/0056264 A1 | 3/2006 | Worley et al. |
| 2006/0294299 A1 | 12/2006 | Edirisooriya |
| 2008/0059752 A1 | 3/2008 | Serizawa |
| 2008/0082736 A1 | 4/2008 | Chow et al. |
| 2008/0082773 A1 | 4/2008 | Tomlin et al. |
| 2008/0189485 A1 | 8/2008 | Jung et al. |
| 2008/0288785 A1* | 11/2008 | Rao .................. G06F 21/72 711/E12.092 |
| 2009/0094463 A1 | 4/2009 | Boucher et al. |
| 2010/0082890 A1 | 4/2010 | Heo et al. |
| 2010/0161887 A1 | 6/2010 | Nakazumi |
| 2010/0262765 A1 | 10/2010 | Cheon et al. |
| 2011/0019486 A1 | 1/2011 | Jang et al. |
| 2011/0082967 A1 | 4/2011 | Deshkar et al. |
| 2012/0246442 A1 | 9/2012 | Dolgunov et al. |
| 2013/0145106 A1 | 6/2013 | Kan |
| 2013/0159766 A1 | 6/2013 | A'Abreu et al. |
| 2013/0166822 A1 | 6/2013 | Franceschini et al. |
| 2013/0179647 A1 | 7/2013 | Park et al. |
| 2013/0269039 A1 | 10/2013 | Gold et al. |
| 2013/0326121 A1 | 12/2013 | Cheng |
| 2014/0019701 A1 | 1/2014 | Ohira et al. |
| 2014/0129761 A1 | 5/2014 | Kwon |
| 2014/0164677 A1 | 6/2014 | Borchers et al. |
| 2014/0325013 A1 | 10/2014 | Tamir et al. |
| 2014/0365719 A1 | 12/2014 | Kuzmin et al. |
| 2015/0178224 A1 | 6/2015 | Seo et al. |
| 2015/0206584 A1 | 7/2015 | Tsai et al. |
| 2015/0293858 A1 | 10/2015 | Raam |
| 2016/0085696 A1 | 3/2016 | Chiu et al. |
| 2016/0197722 A1 | 7/2016 | Mothilal |
| 2016/0217089 A1 | 7/2016 | Hsu et al. |
| 2016/0266818 A1 | 9/2016 | Lin et al. |
| 2017/0093823 A1 | 3/2017 | Gopal et al. |
| 2017/0109089 A1 | 4/2017 | Huang |
| 2017/0177497 A1 | 6/2017 | Chun et al. |
| 2017/0192902 A1* | 7/2017 | Hwang .................. G06F 12/0246 |
| 2018/0060607 A1 | 3/2018 | Tasher et al. |
| 2018/0113631 A1 | 4/2018 | Zhang et al. |
| 2018/0181328 A1 | 6/2018 | Espeseth et al. |
| 2018/0324181 A1 | 11/2018 | Serebrin |
| 2019/0004944 A1 | 1/2019 | Widder et al. |
| 2019/0121576 A1 | 4/2019 | Jean |
| 2019/0129838 A1 | 5/2019 | Yoshida et al. |
| 2019/0258567 A1 | 8/2019 | Kim et al. |
| 2019/0287632 A1 | 9/2019 | Asano et al. |
| 2020/0004694 A1 | 1/2020 | Szubbocsev et al. |
| 2020/0005876 A1 | 1/2020 | Yamada |
| 2020/0042436 A1 | 2/2020 | Palmer |
| 2020/0043561 A1 | 2/2020 | Palmer |
| 2020/0097194 A1 | 3/2020 | Grosz |
| 2020/0118634 A1 | 4/2020 | Yamada |
| 2020/0142631 A1 | 5/2020 | Song et al. |
| 2020/0143040 A1 | 5/2020 | Sutton et al. |
| 2020/0201752 A1 | 6/2020 | Palmer |
| 2020/0201784 A1 | 6/2020 | Palmer |
| 2021/0365364 A1 | 11/2021 | Palmer et al. |
| 2022/0179783 A1 | 6/2022 | Palmer |

FOREIGN PATENT DOCUMENTS

| | | |
|---|---|---|
| CN | 107015920 A | 8/2017 |
| CN | 107438850 A | 12/2017 |
| CN | 110175138 A | 8/2019 |
| CN | 112673357 A | 4/2021 |
| CN | 112771491 A | 5/2021 |
| CN | 113196245 A | 7/2021 |
| CN | 113439264 | 9/2021 |
| CN | 112771491 | 4/2022 |
| CN | 114579476 A | 6/2022 |
| JP | 2005322201 A | 11/2005 |
| JP | 2013191174 A | 9/2013 |
| JP | 2017519269 A | 7/2017 |
| JP | 2017162067 A | 9/2017 |
| KR | 20150126232 A | 11/2015 |
| KR | 20160021957 A | 2/2016 |
| KR | 20170081118 A | 7/2017 |
| KR | 20170125698 A | 11/2017 |
| KR | 102377365 | 3/2022 |
| KR | 102437704 B1 | 8/2022 |
| TW | 201333963 A | 8/2013 |
| TW | 201514697 | 4/2015 |
| TW | I641966 | 11/2018 |
| TW | 202038086 A | 10/2020 |
| TW | 202141267 | 11/2021 |
| WO | WO-2005015818 A1 | 2/2005 |
| WO | WO-2020028804 A1 | 2/2020 |
| WO | WO-2020068669 A1 | 4/2020 |
| WO | WO-2020131913 A1 | 6/2020 |
| WO | WO-2020132274 A1 | 6/2020 |

OTHER PUBLICATIONS

"Chinese Application Serial No. 201980059061.6, Voluntary Amendment Filed Aug. 5, 2021", w English Claims, 22 pgs.

"Korean Application Serial No. 10-2021-7008127, Response filed Sep. 29, 2021 to Notice of Preliminary Rejection dated Jul. 30, 2021", w English Claims, 16 pgs.

"Japanese Application Serial No. 2021-535543, Voluntary Amendment Filed Oct. 19, 2021", w o English Claims, 4 pgs.

"European Application Serial No. 19898012.0, Response Filed Feb. 14, 2022 to Communication pursuant to Rules 161 (2) and 162 EPC dated Feb. 15, 2022", W English Claims, 12 pgs.

"Chinese Application Serial No. 201980083546.9, Office Action dated Mar. 24, 2022", w English translation, 19 pgs.

"Taiwanese Application Serial No. 110126065, Office Action dated Apr. 8, 2022", w English Translation, 8 pgs.

"Chinese Application Serial No. 201980059061.6, Office Action dated May 20, 2022", W English Translation, 12 pgs.

"Chinese Application Serial No. 201980083546.9, Voluntary Amendment filed Jan. 13, 2022", w English Claims, 16 pgs.

"Japanese Application Serial No. 2021-535543, Voluntary Amendment Filed Apr. 4, 2022", w English Translation, 3 pgs.

"Korean Application Serial No. 10-2021-7008127, Response filed Mar. 18, 2022 to Notice of Preliminary Rejection dated Dec. 21, 2021", w English Claims.

"Chinese Application Serial No. 201980062579.5, Office Action dated Aug. 2, 2021", w/ English translation, 9 pgs.

"Chinese Application Serial No. 201980083546.9, Notification to Make Rectification dated Jul. 5, 2021", w/o English translation, 1 pg.

"Chinese Application Serial No. 201980083546.9, Response filed Aug. 30, 2021 to Notification to Make Rectification dated Jul. 5, 2021", 1 pg.

"International Application Serial No. PCT/US2019/044909, International Preliminary Report on Patentability dated Feb. 18, 2021", 8 pgs.

(56) References Cited

OTHER PUBLICATIONS

"International Application Serial No. PCT/US2019/044909, International Search Report dated Nov. 15, 2019", 4 pgs.
"International Application Serial No. PCT/US2019/044909, Written Opinion dated Nov. 15, 2019", 4 pgs.
"International Application Serial No. PCT/US2019/052435, International Preliminary Report on Patentability dated Apr. 8, 2021", 8 pgs.
"International Application Serial No. PCT/US2019/052435, International Search Report dated Jan. 13, 2020", 4 pgs.
"International Application Serial No. PCT/US2019/052435, Written Opinion dated Jan. 13, 2020", 5 pgs.
"International Application Serial No. PCT/US2019/066914, International Preliminary Report on Patentability dated Jul. 1, 2021", 6 pgs.
"International Application Serial No. PCT/US2019/066914, International Search Report dated Apr. 20, 2020", 3 pgs.
"International Application Serial No. PCT/US2019/066914, Written Opinion dated Apr. 20, 2020", 4 pgs.
"International Application Serial No. PCT/US2019/067531, International Preliminary Report on Patentability dated Jul. 1, 2021", 8 pgs.
"International Application Serial No. PCT/US2019/067531, International Search Report dated May 1, 2020", 3 pgs.
"International Application Serial No. PCT/US2019/067531, Written Opinion dated May 1, 2020", 6 pgs.
"Korean Application Serial No. 10-2021-7008127, Notice of Preliminary Rejection dated Jul. 30, 2021", w/ English translation, 6 pgs.
"Taiwanese Application Serial No. 108146582, Office Action dated Sep. 21, 2020", w/ English Translation, 15 pgs.
"Taiwanese Application Serial No. 108146582, Response filed Dec. 18, 2020 to Office Action dated Sep. 21, 2020", w/ English Claims, 38 pgs.
Chin-Hsien, Wu, "A Space-Efficient Caching Mechanism for Flash-Memory Address Translation", Proceedings of the Ninth IEEE International Symposium on Object and Component-Oriented Real-Time Distributed Computing, (2006), 8 pgs.
Wookhan, Jeong, et al., "Improving Flash Storage Performance by Caching Address Mapping Table in Host Memory", Samsung Electronics Co., Ltd, Retrieved from the Internet: URL:https://www.usenix.org/system/files/conference/hotstorage17/hotstorage17-paper-jeong.pdf [retrieved on Nov. 2, 2020], (Jul. 2017), 6 pgs.
Y, Qin, et al., "A Property-Based Attestation Scheme with the Variable Privacy", IEEE 10th International Conference on Trust, Security and Privacy in Computing and Communications, Changsha, (2011), 1616-1623.
"Chinese Application Serial No. 201980059061.6, Response filed Sep. 30, 2022 to Office Action dated May 20, 2022", with English claims, 22 pages.
"Chinese Application Serial No. 201980083546.9, Office Action dated Sep. 8, 2022", with English translation, 19 pages.
"Chinese Application Serial No. 201980083546.9, Response filed Aug. 8, 2022 to Office Action dated Mar. 24, 2022", with English claims, 10 pages.
"European Application Serial No. 19898012.0, Extended European Search Report dated Aug. 19, 2022", 10 pgs.
"Japanese Application Serial No. 2021-535543, Notification of Reasons for Rejection dated Aug. 23, 2022", with English translation, 19 pages.
"Korean Application Serial No. 10-2022-7029363, Notice of Preliminary Rejection dated Dec. 14, 2022", With English machine translation, 13 pgs.
"Taiwanese Application Serial No. 110126065, Office Action dated Nov. 28, 2022", with machine English translation, 25 pages.
"Taiwanese Application Serial No. 110126065, Response filed Jul. 18, 2022 to Office Action dated Apr. 8, 2022", with English claims, 44 pages.
"Korean Application Serial No. 10-2021-7017849, Office Action dated Oct. 18, 2021", w English translation, 5 pgs.
"Chinese Application Serial No. 201980083546.9, Response filed Aug. 30, 2021 to Notification to Make Rectification dated Jul. 5, 2021", w o English translation, 1 pg.
"Korean Application Serial No. 10-2021-7008127, Notice of Preliminary Rejection dated Dec. 21, 2021", w English translation, 5 pgs.

* cited by examiner

US 11,687,469 B2

HOST-RESIDENT TRANSLATION LAYER VALIDITY CHECK TECHNIQUES

PRIORITY APPLICATION

This application is a continuation of U.S. application Ser. No. 16/226,078, filed Dec. 19, 2018, which is incorporated herein by reference in its entirety.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Flash memory based storage devices such as NAND memory can use a Flash Translation Layer (FTL) to translate logical addresses of I/O requests, often referred to as logical block addresses (LBAs), to corresponding flash memory addresses which are stored in one or more FTL mapping tables. LBAs can be the logical addresses used by a host for managing data. Mobile storage devices typically have a cache with constrained size, and thus often lack memory to store an entire mapping table. Therefore, portions of the mapping table(s) can be retrieved from the flash memory on demand, which can cause random read performance degradation.

In order to improve random read performance, techniques described herein enable use of host-resident memory, in addition to memory cells of a memory device coupled to the host, as a cache for a FTL mapping table. Under a host-resident FTL, FTL data can be read from host memory faster than from flash memory, and the host can initiate a memory operation by retrieving a physical address (PA) of the flash memory and including the PA in a memory request to the flash memory. The PA can be retrieved by the host using the FTL memory cache of the host and the LBA of the host. Upon receiving the memory request, the flash memory system can immediately retrieve the data associated with the physical address without the delay associated with accessing the flash memory-based mapping table and using the LBA to obtain the physical address.

In certain implementations of a host-resident FTL, improvements in random read workload performance can be significant. However, the present inventors have identified techniques for host-resident FTL that can assist in validating the integrity of host memory requests, can assist in maintaining coherency between the host FTL table and the actual flash mapping table, and can assist in providing timely updates to the host FTL table while host-triggered memory operations are at or near idle. Straightforward implementations of host-resident FTL can assume that the mapping table remains accurate between host initiated operations. However, the memory system or memory device connected to the host often performs housekeeping operations such a garbage collection and wear leveling in between host initiated operations or during times when the host is idle. Housekeeping operations move data around and often revise and update, the mapping table resident at the memory device. Without some validity checks, straight forward implementation of host-resident FTL, such as a memory system blindly using the host-provided PA to access flash data, can often result in the memory system accessing flash memory at the wrong PA.

Figure 1:
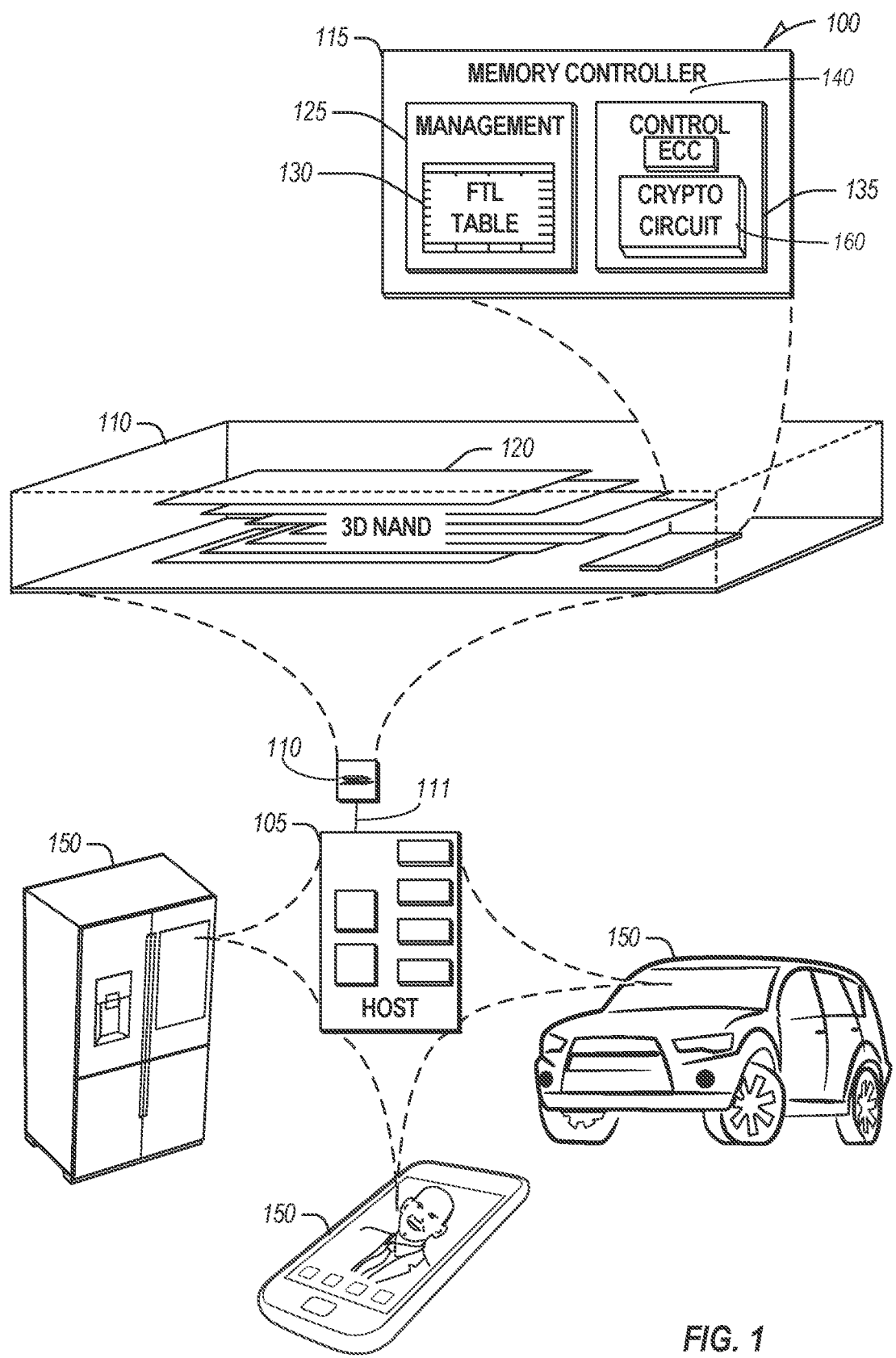
FIG. 1 illustrates an example system an environment including a memory device upon which one or more examples of the present subject matter may be implemented.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 400 of FIG. 4. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

The described memory device 110 includes cryptography circuitry 160 in association with the memory array 120. In certain examples, the cryptography circuitry 160 can include an encryption circuit, a decryption circuit, or a combination thereof. In some implementations, memory controller 115 of memory device 110 may include control circuitry configured to implement the functions of the cryptography circuit 160. In other implementations, the cryptography circuit 160 may include an independent control circuitry for implementing the described functionality. In yet other implementations, control circuitry may be divided between the cryptography circuit 160 and memory controller 115 to implement the described functions of the cryptography circuit 160. In the depicted example, the array controller 135 forms a portion of the memory controller 115, and the cryptography circuit 160 forms a portion of the array controller. In other implementations, cryptography circuit 160 may be external, and/or outside of array controller 135. For example, the cryptography circuit 160 (or any individual components thereof), may be an independent component coupled to one or more components in environment 100. However physically located, the structures providing the additional functionality of the cryptography circuit 160, function to verify physical addresses provided by the host 105 to prevent erroneous or malicious access to the memory device and to provide opportunities for the host to refresh the host-resident mapping table information to align the mapping information with the mapping information of the memory device during host-resident FTL operation of the environment 100.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory controller 115 and can include an FTL table). For example, the management tables 130 can include information regarding FTL mapping information, block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

Figure 2:
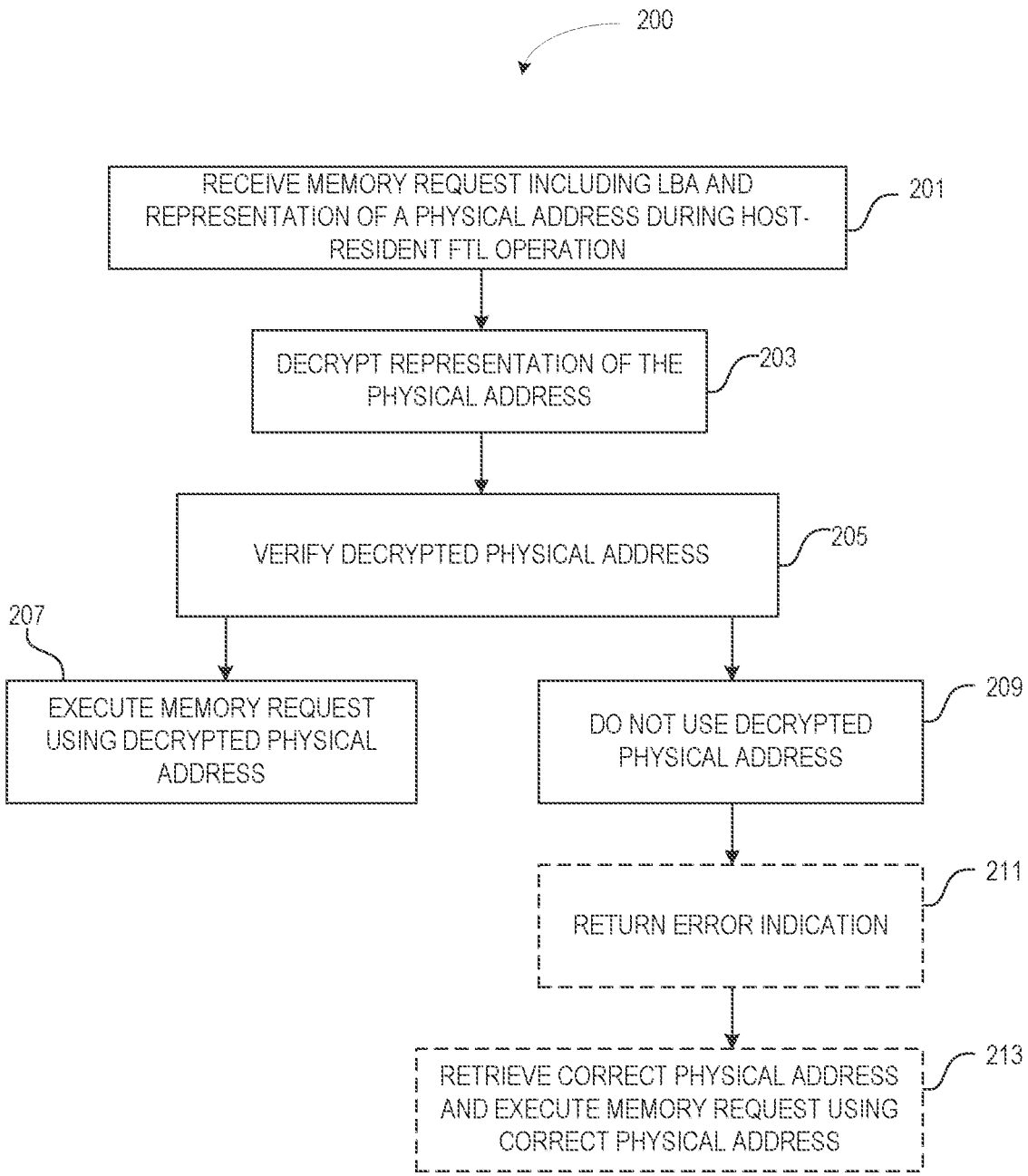
FIG. 2 illustrates generally a flowchart of an example method for implementing memory operations at a flash memory system using aspects of host-resident FTL.

FIG. 2 illustrates generally a flowchart of an example method 200 for implementing memory operations at a flash memory system using aspects of host-resident FTL. In certain examples, the method can assist in validating that the physical address received from the host corresponds to the LBA provided by the host. Without some form of verification, a malicious host can provide an LBA and an unrelated physical address that may result in accessing flash memory data not intended to be accessible by the host, or not intended to be accessed by the host using the particular host memory request received at the memory system. At 201, the memory system can receive a host memory request including an LBA and a representation of a physical address during a host-resident FTL mode of operation. The LBA represents a memory location within the memory system of the host. The physical address represents a memory location within the flash memory of the flash memory system. Outside of the host-resident FTL mode of operation, the memory controller of the flash memory system can located the physical address mapped to the received LBA using mapping information within a cache of the memory controller or using a full mapping table stored on flash memory of the flash memory system. During a host-resident FTL mode of operation, the host can provide the mapped physical address, or a representation thereof, associated with the LBA. In certain situations, providing the mapped physical address can reduce the frequency that the memory controller retrieves memory information from the flash memory of the flash memory system. Accessing flash memory to retrieve memory mapping information can significantly reduce performance of memory operation of the host, therefore, reducing the frequency that the memory controller retrieves memory mapping information can significantly enhance performance of memory requests of the host.

To prevent unintended or malicious access to restricted areas of flash memory of the memory system, at 203, the representation of the physical address can be decrypted using a key of the flash memory system. In certain examples, the flash memory system can include a cryptography circuit. In certain examples, the cryptography circuit can be part of the memory controller. The cryptography circuit may be implemented in hardware, firmware, software, or a combination thereof.

At 205, the decrypted physical address can be verified as a valid physical address of the flash memory system for the memory request. In certain examples, verification can include locating the LBA in a cache of the memory controller and comparing the decrypted physical address with the physical address mapped to the LBA. Whether the LBA is located within the cache of the memory controller, the memory controller can compare the decrypted physical address with a table including address regions that are not restricted for the memory request and verifying the decrypted physical address falls within one of the address regions.

At 207, when the memory controller has verified the decrypted physical address is a valid physical address for the memory request, the memory controller can execute the memory request using the decrypted physical address. When the memory controller fails to verify the decrypted physical address is a valid physical address for the memory request, the memory controller does not execute the memory request using the decrypted physical address.

At 209, when the memory controller fails to verify the decrypted physical address is a valid physical address for the memory request, the memory controller does not use the decrypted physical address to execute the memory request. At 211, the memory controller can optionally return an error indication to the host. At 213, when the memory controller fails to verify the decrypted physical address is a valid physical address for the memory request, the memory controller can optionally retrieve a correct physical address associated with the LBA using the mapping information stored and maintained in either the cache or the flash memory of the flash memory system and then, at 213, execute the memory request using the correct physical address. In certain examples, the LBA may be verified as a valid LBA at the memory system. Such verification can include comparing the received LBA to entries of a table of valid LBAs. If the received LBA does not match an entry of the table of valid LBAs, the memory controller can ignore the memory request, return an error indication, or combination thereof.

Figure 3:
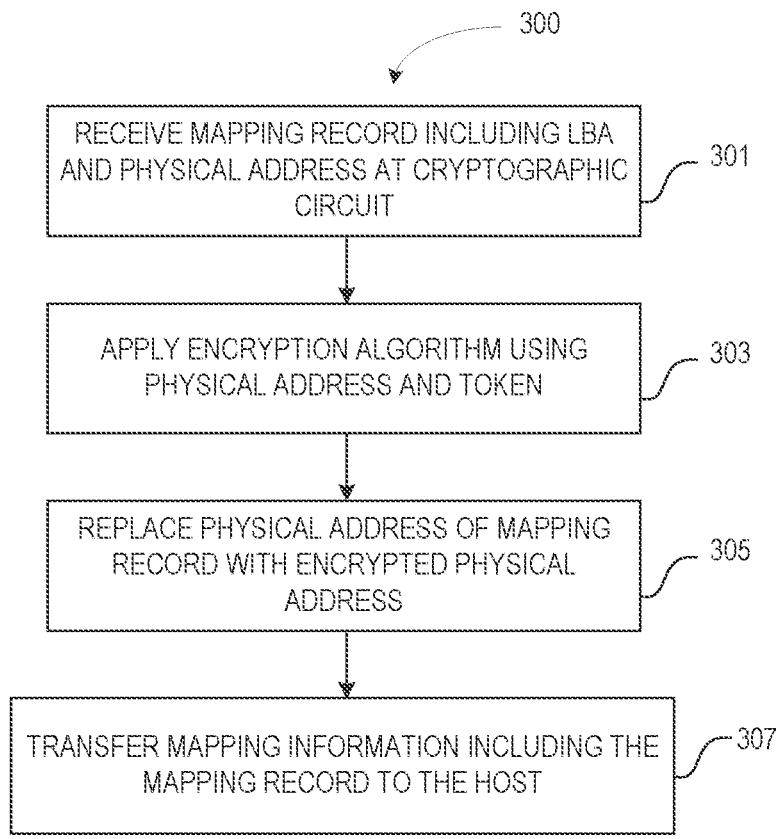
FIG. 3 illustrates generally a flowchart of an example method for efficiently monitoring and updating host mapping table data for host-resident FTL operation.

In certain examples, the mapping information provided to the host for use during a host-resident FTL mode of operation is provided by the memory device. Prior to providing the mapping information to the host, the memory controller of the flash memory system can encrypt the physical address and provided an encrypted representation of each physical address of instead of the actual physical address. FIG. 3 illustrates generally a flowchart of an example method 300 for providing mapping information to the host from a flash memory system. The memory controller can generate mapping information as memory requests are received from the host. The mapping information can be quite large such that it is stored on flash memory along with stored data. In certain examples, the mapping information can be stored in a table with records in the table including a LBA associated with a memory location of the host and a physical address associated with a memory location of the flash memory system mapped to the LBA. At 301, the memory controller, or a cryptographic circuit of the memory controller, can receive a mapping table record. The mapping table record can include an LBA and a physical address of the flash memory system mapped to the LBA. IN certain examples, the memory controller maps the each LBA of the host with a corresponding physical address of the flash memory system as the host makes memory requests of the flash memory system.

At 301, the cryptographic circuit can receive mapping information, such as a mapping record of a mapping table that includes an LBA of a host and a physical address of the flash memory system mapped to the LBA. The cryptographic circuit can be part of the flash memory system. In some examples, the cryptographic circuit can be part of a memory controller of the flash memory system. At 303, the cryptographic circuit can apply an encryption algorithm to the physical address using a token. In certain examples, the token can be hardcoded in non-volatile memory of the flash memory system. Application of the encryption algorithm generates an encrypted version of the physical address. At 305, the physical address of the mapping record can be replaced with the necryted version of the physical address. At 307, mapping information can be transferred to the host for use during a host-resident FTL mode of operation of the system including the host and the flash memory system. The mapping information can include mapping records that include an LBA and a corresponding encrypted version of the physical addressed to the LBA.

Figure 4:
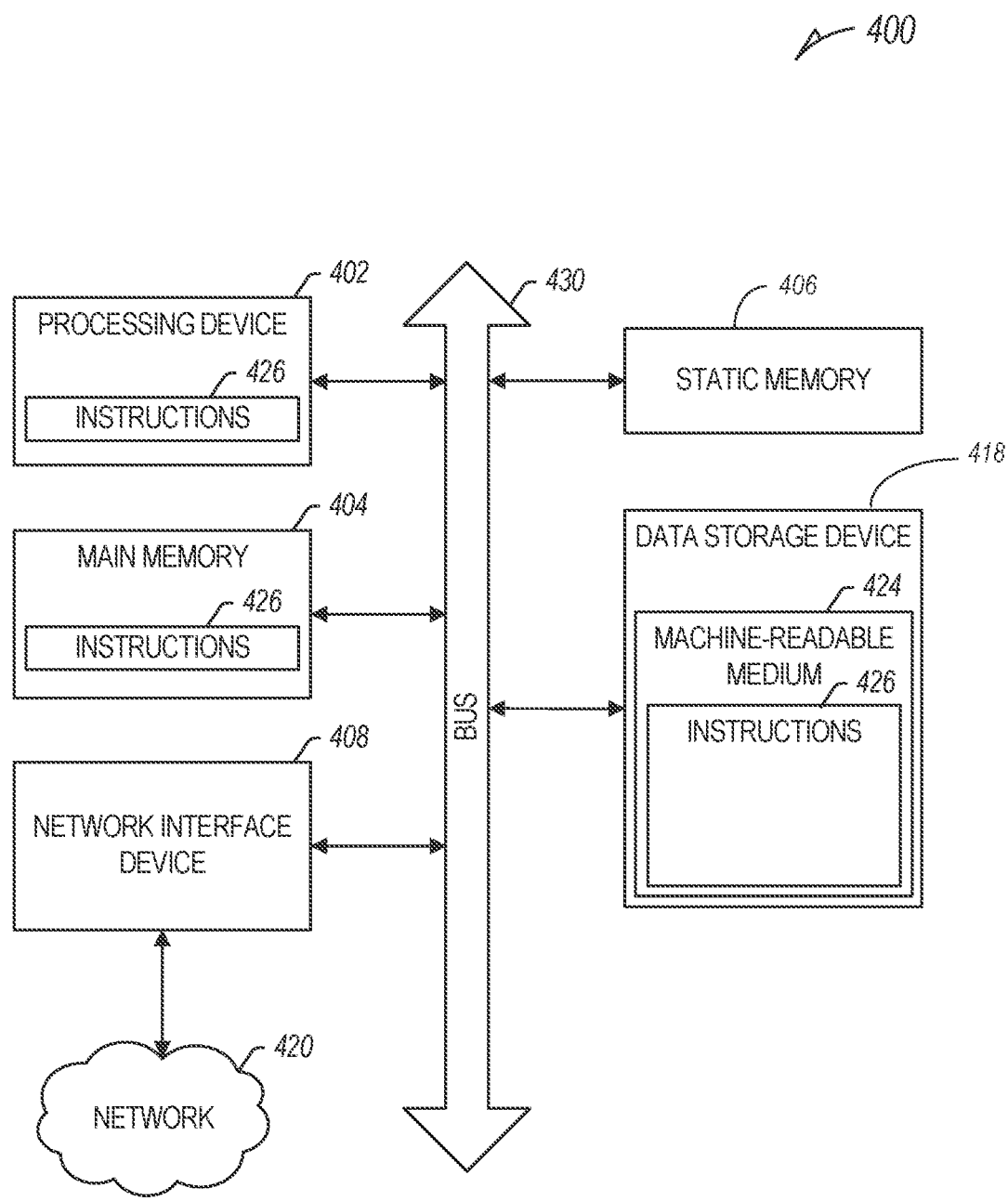
FIG. 4 illustrates a block diagram of an example machine upon which any one or more of the techniques (e.g., methodologies) discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 400 (e.g., the host 105, the memory device 110, etc.) may include a processing device 402 (e.g., a hardware processor, a central processing unit (CPU), a graphics processing unit (GPU), a hardware processor core, or any combination thereof, such as a memory controller of the memory device 110, etc.), a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage system 418, some or all of which may communicate with each other via an interlink (e.g., bus) 430.

The processing device 402 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 can be configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 or within the processing device 402 during execution thereof by the computer system 400, the main memory 404 and the processing device 402 also constituting machine-readable storage media. The machine-readable storage medium 424, the data storage system 418, or the main memory 404 can correspond to the memory device 110 of FIG. 1.

In one implementation, the instructions 426 include instructions to implement functionality corresponding to one or more host-resident FTL operations discussed above with respect to FIG. 2 or FIG. 3. While the machine-readable storage medium 424 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 400 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 400 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 426 (e.g., software, programs, an operating system (OS), etc.) or other data are stored on the data storage device 418 can be accessed by the main memory 404 for use by the processing device 402. The main memory 404 (e.g., DRAM) is typically fast, but volatile, and thus a different type of storage than the data storage device 418 (e.g., an SSD), which is suitable for long-term storage, including while in an "off" condition. The instructions 426 or data in use by a user or the machine 400 are typically loaded in the main memory 404 for use by the processing device 402. When the main memory 404 is full, virtual space from the data storage device 418 can be allocated to supplement the main memory 404; however, because the data storage device 418 device is typically slower than the main memory 404, and write speeds are typically at least twice as slow as read speeds, use of virtual memory can greatly reduce user experience due to storage device latency (in contrast to the main memory 404, e.g., DRAM). Further, use of the data storage device 418 for virtual memory can greatly reduce the usable lifespan of the data storage device 418.

In contrast to virtual memory, virtual memory compression (e.g., the Linux™ kernel feature "ZRAM") uses part of the memory as compressed block storage to avoid paging to the data storage device 418. Paging takes place in the compressed block until it is necessary to write such data to the data storage device 418. Virtual memory compression increases the usable size of the main memory 404, while reducing wear on the data storage device 418.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 424 may further be transmitted or received over a network 420 using a transmission medium via the network interface device 408 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as)WiMax®), IEEE 802.15.4 family of standards, peer-to-peer (P2P) networks, among others. In an example, the network interface device 408 may include one or more physical jacks (e.g., Ethernet, coaxial, or phone jacks) or one or more antennas to connect to the network 420. In an example, the network interface device 408 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

ADDITIONAL NOTES AND EXAMPLES

Example 1 is a method comprising: receiving a memory request from a host at a memory system, the memory request including a logical block address (LBA) associated with the host and a first representation of a physical address associated with the memory system; decrypt the first representation of the physical address at a decryption circuit using a key of the memory system to provide a second representation of the physical address; and executing the memory request using the second representation.

In Example 2, the subject matter of Example 1, wherein decrypt the first representation of the physical address includes applying a decryption algorithm to the first representation using the key to provide a decrypted representation of the first representation.

In Example 3, the subject matter of Example 2, wherein decrypt the first representation of the physical address includes: determining the decrypted representation is a valid physical address of the memory system; and setting the second representation equal to the decrypted representation of the first representation of the physical address.

In Example 4, the subject matter of any of Examples 2-3, wherein decrypt the first representation of the physical address includes: determining the decrypted representation is not a valid physical address of the memory system; determining a correct physical address of the memory system associated with the LBA received from the host using memory system-resident mapping information; and setting the second representation equal to the correct physical address.

In Example 5, the subject matter of Example 4, wherein determining a correct physical address and setting the second representation includes searching a cache of the memory system for the LBA.

In Example 6, the subject matter of Example 5, when the LBA is located in the cache, retrieving the correct physical address from the cache.

In Example 7, the subject matter of any of Examples 5-6, when the LBA is not located in the cache, retrieving mapping information including the LBA from flash memory of the memory system to the cache.

In Example 8, the subject matter of any of Examples 1-7, including mapping the physical address to the logical block address at the memory system.

In Example 9, the subject matter of Example 8, including encrypting the physical address at the memory system to provide the first representation.

In Example 10, the subject matter of Example 9, including communicating mapping information from the memory system to the host, wherein the mapping information includes the LBA and the first representation of the physical address.

In Example 11, the subject matter of Example 10, wherein communicating mapping information from the memory system to the host includes communicating mapping information from the memory system to the host prior to the receiving a memory request from a host at a memory system.

Example 12 is a memory device comprising: a cache configured to hold a portion of a mapping table of the memory device; flash memory configured to store and retrieve user data of a host, and to store the mapping table of the memory device; and a controller configured to: receive a memory request from a host, the memory request including a logical block address (LBA) associated with the host and a first representation of a physical address associated with the memory device; decrypt the first representation of the physical address at a decryption circuit using a key of the memory device to provide a second representation of the physical address; and executing the memory request using the second representation.

In Example 13, the subject matter of Example 12, wherein the controller is configured to receive an indication of a performance boost mode of operation at the memory device prior to receiving the memory request including the LBA and the first representation.

In Example 14, the subject matter of any of Examples 12-13, including the decryption circuit; and wherein the decryption circuit is configured to apply a decryption algorithm to the first representation using the key, to provide a decrypted representation of the first representation.

In Example 15, the subject matter of Example 14, wherein the controller is configured to determine the decrypted representation is a valid physical address of the memory device, and to set the second representation equal to the decrypted representation of the first representation of the physical address.

In Example 16, the subject matter of any of Examples 14-15, wherein the controller is configured to determine the decrypted representation is not a valid physical address of the memory device, to determine a correct physical address of the memory device associated with the LBA received from the host using mapping information of the cache or the flash memory, and to set the second representation equal to the correct physical address.

In Example 17, the subject matter of Example 16, wherein the controller is configured to search a cache of the memory device for the LBA when the decrypted representation is not a valid physical address of the memory device.

In Example 18, the subject matter of Example 17, wherein, when the LBA is located in the cache, the controller is configured to retrieve the correct physical address from the cache.

In Example 19, the subject matter of any of Examples 12-18, wherein, when the LBA is not located in the cache, the controller is configured to retrieve mapping information including the LBA from the flash memory to the cache.

In Example 20, the subject matter of any of Examples 12-19, wherein the controller is configured to map the physical address to the logical block address.

In Example 21, the subject matter of Example 20, wherein the controller includes an encryption circuit, the encryption circuit configured to encrypt the physical address to provide the first representation.

In Example 22, the subject matter of Example 21, wherein the controller is configured to communicate mapping information to the host, wherein the mapping information includes the LBA and the first representation of the physical address.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising:
    receiving, at a memory system, a memory request from a host, the memory request including a logical block address (LBA) associated with the host and a first representation of a physical address associated with the memory system;
    decrypting the first representation of the physical address at a decryption circuit using a key of the memory system to provide a second representation of the physical address, wherein decrypting the first representation of the physical address includes:
applying a decryption algorithm to the first representation using the key to provide a decrypted representation of the first representation;
determining the decrypted representation is not a valid physical address of the memory system;
determining a correct physical address of the memory system associated with the LBA received from the host using memory system-resident mapping information; and
executing the memory request using the correct physical address.

2. The method of claim 1, wherein determining the correct physical address comprises searching a cache of the memory system for the LBA.

3. The method of claim 2, further comprising determining that the LBA is located in the cache, and in response, retrieving the correct physical address from a cache entry corresponding to the LBA.

4. The method of claim 2, further comprising determining that the LBA is not located in the cache, and in response, retrieving mapping information including the LBA from flash memory of the memory system to the cache.

5. The method of claim 4, further comprising providing the mapping information to the host.

6. The method of claim 5, wherein communicating the mapping information from the memory system to the host includes communicating the mapping information from the memory system to the host prior to the receiving the memory request from the host at the memory system.

7. The method of claim 1, further comprising mapping the physical address to the logical block address at the memory system.

8. A memory system comprising:
a controller, configured to perform operations comprising:
receiving a memory request from a host, the memory request including a logical block address (LBA) associated with the host and a first representation of a physical address associated with the memory system;
decrypting the first representation of the physical address at a decryption circuit using a key of the memory system to provide a second representation of the physical address, wherein decrypting the first representation of the physical address includes:
applying a decryption algorithm to the first representation using the key to provide a decrypted representation of the first representation;
determining the decrypted representation is not a valid physical address of the memory system;
determining a correct physical address of the memory system associated with the LBA received from the host using memory system-resident mapping information; and
executing the memory request using the correct physical address.

9. The memory system of claim 8, wherein the operations of determining the correct physical address comprises searching a cache of the memory system for the LBA.

10. The memory system of claim 9, wherein the operations further comprise determining that the LBA is located in the cache, and in response, retrieving the correct physical address from a cache entry corresponding to the LBA.

11. The memory system of claim 9, wherein the operations further comprise determining that the LBA is not located in the cache, and in response, retrieving mapping information including the LBA from flash memory of the memory system to the cache.

12. The memory system of claim 11, wherein the operations further comprise providing the mapping information to the host.

13. The memory system of claim 12, wherein the operations comprise communicating the mapping information from the memory system to the host includes communicating the mapping information from the memory system to the host prior to the receiving the memory request from the host at the memory system.

14. The memory system of claim 8, wherein the operations further comprise mapping the physical address to the logical block address at the memory system.

15. A non-transitory machine-readable medium, storing instructions, which when executed by a controller of a memory system, cause the controller to perform operations comprising:
receiving a memory request from a host, the memory request including a logical block address (LBA) associated with the host and a first representation of a physical address associated with the memory system;
decrypting the first representation of the physical address at a decryption circuit using a key of the memory system to provide a second representation of the physical address, wherein decrypting the first representation of the physical address includes:
applying a decryption algorithm to the first representation using the key to provide a decrypted representation of the first representation;
determining the decrypted representation is not a valid physical address of the memory system;
determining a correct physical address of the memory system associated with the LBA received from the host using memory system-resident mapping information; and
executing the memory request using the correct physical address.

16. The non-transitory machine-readable medium of claim 15, wherein the operations of determining the correct physical address comprises searching a cache of the memory system for the LBA.

17. The non-transitory machine-readable medium of claim 16, wherein the operations further comprise determining that the LBA is located in the cache, and in response, retrieving the correct physical address from a cache entry corresponding to the LBA.

18. The non-transitory machine-readable medium of claim 16, wherein the operations further comprise determining that the LBA is not located in the cache, and in response, retrieving mapping information including the LBA from flash memory of the memory system to the cache.

19. The non-transitory machine-readable medium of claim 18, wherein the operations further comprise providing the mapping information to the host.

* * * * *